(12) United States Patent
Watanabe et al.

(10) Patent No.: US 7,139,826 B2
(45) Date of Patent: Nov. 21, 2006

(54) INITIAL COPY FOR REMOTE COPY

(75) Inventors: Naoki Watanabe, Sunnyvale, CA (US);
Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 661 days.

(21) Appl. No.: 09/905,440

(22) Filed: Jul. 13, 2001

(65) Prior Publication Data
US 2003/0014534 A1   Jan. 16, 2003

(51) Int. Cl.
*G06F 15/173* (2006.01)

(52) U.S. Cl. .................. 709/226; 709/223; 709/233; 709/238

(58) Field of Classification Search ........... 709/250, 709/238, 223, 232, 233, 226; 711/162
See application file for complete search history.

(56) References Cited

U.S. PATENT DOCUMENTS

| | | | |
|---|---|---|---|
| 5,724,500 A * | 3/1998 | Shinmura et al. ........... 714/6 |
| 5,742,792 A | 4/1998 | Yanai et al. |
| 6,173,377 B1 * | 1/2001 | Yanai et al. ............... 711/162 |
| 6,308,283 B1 * | 10/2001 | Galipeau et al. ........... 714/6 |
| 6,324,654 B1 * | 11/2001 | Wahl et al. ................ 714/6 |
| 6,424,993 B1 * | 7/2002 | Weber ..................... 709/203 |
| 6,446,175 B1 * | 9/2002 | West et al. ............... 711/162 |
| 6,446,176 B1 * | 9/2002 | West et al. ............... 711/162 |
| 6,467,034 B1 * | 10/2002 | Yanaka ................... 711/162 |
| 6,499,112 B1 * | 12/2002 | Milillo et al. ............ 714/6 |
| 6,526,487 B1 * | 2/2003 | Ohran et al. ............. 711/162 |
| 6,553,005 B1 * | 4/2003 | Skirmont et al. ........... 370/285 |
| 6,560,617 B1 * | 5/2003 | Winger et al. ............. 707/204 |
| 2001/0002195 A1 * | 5/2001 | Fellman et al. ............ 370/420 |
| 2001/0047412 A1 * | 11/2001 | Weinman, Jr. ............. 709/225 |
| 2002/0067727 A1 * | 6/2002 | Gallant et al. ............ 370/395.2 |
| 2003/0169780 A1 * | 9/2003 | Kukic ..................... 370/535 |
| 2005/0188253 A1 * | 8/2005 | Kawamura et al. .......... 714/6 |

OTHER PUBLICATIONS

Paul a. Bottorff, "Parallel Path Trunking," Nov. 11, 1997, http://www.ieee302.org/3trunk_study/february98/thompson.pdf, pp. 1-13.*

* cited by examiner

*Primary Examiner*—Khanh Dinh
*Assistant Examiner*—Nghi Tran
(74) *Attorney, Agent, or Firm*—Sughrue Mion, PLLC; Pavel Pogodin, Esq.

(57) ABSTRACT

A method of performing an initial copy procedure in a remote copy system, the method including: configuring a network path between a first disk subsystem and a second disk subsystem to increase the speed of data transmission across the network path; configuring the remote copy system for a remote copy operation; performing an initial copy operation to copy data across the network path from the first disk subsystem to the second disk subsystem; and adjusting the network path to reduce the speed of data transmission across the network path. A remote copy system, including: a first disk subsystem located at a first site; and a second disk subsystem capable to be coupled to the first disk subsystem via a network path, with the network path capable to be configured to increase or decrease the speed of data transmission from the first disk subsystem to the second disk subsystem.

18 Claims, 8 Drawing Sheets

INITIAL COPY FOR REMOTE COPY

TECHNICAL FIELD

The present invention relates to data storage systems, and relates more particularly to systems, devices, and methods for creating an initial copy in data storage systems.

BACKGROUND

The connected economy is information-intensive. Maintaining an uninterrupted flow of information is important for many businesses and organizations in this environment. Additionally, maintaining accurate copies of information is important for businesses and organizations. Data protection and rapid data recovery is desired in the event of a disruptive event such as a power outage.

In one type of computing system, a master host (e.g., a server) is located at a master site and a remote host is located at a remote site. The remote host is typically geographically dispersed (e.g., several hundred miles) from the master host. Each host has its own associated storage system (e.g., a disk subsystem). Typically, in a remote copy system, the data contained in the master host is copied to the remote host. The network connecting the master host and the remote host is typically a Wide Area Network (WAN), such as the Internet.

When running a remote copy procedure so that identical data is stored in the disk subsystem(s) on the master site and the disk subsystem(s) on the remote site, the network administrator first initiates an initial copy procedure so that data is copied from the master site to the remote site. Various known methods are used to copy data from the master site to the remote site. However, if the data to be copied is large in amount, then the time required for copying will be longer in length. For example, to copy 100 Tera bytes of data by using a network of 100 Megabytes/sec will require 11.57 days.

In addition, an initial copy procedure requires interruption of the host input/output functions.

U.S. Pat. Nos. 5,742,792 and 6,173,377 each discloses two data storage systems that are interconnected by a data link for remote mirroring of data. A host computer directly accesses a primary volume, and data that is written to the primary volume is automatically sent over the link to a corresponding secondary volume. However, these references only disclose providing a copy from the primary volume to the secondary volume by use of the network link.

Other references related to data transmission are the following. The "Fibre Channel Physical And Signaling Interface (FC-PH) Rev. 4.3" standard describes the point-to-point physical interface, transmission protocol, and signaling protocol of a high-performance serial link for support of higher level protocols associated with High-Performance Parallel Interface (HPPI), Intelligent Peripheral Interface (IPI), Small Computer System Interface (SCSI), and other standards. The "Fibre Channel Switch Fabric (FC-SW) Rev. 3.3" standard specifies tools and algorithms for interconnection and initialization of fibre channel switches to create a multi-switch fibre channel fabric. The SCSI standards are several standards defined by the American National Standard for Information Technology (ANSI). SCSI Primary Command 2 (SPC-2) is one of the standards of SCSI. SPC-2 contains the second-generation definition of the basic commands for all SCSI devices.

There is a need for a system and method that will overcome the above-mentioned deficiencies of conventional methods and systems. There is also a need for a system and method that will increase the efficiency of performing the initial copy procedure in a disk subsystem environment.

SUMMARY

An embodiment of the present invention may advantageously provide an efficient technique for performing the initial copy procedure in a disk subsystem environment that has the remote copy function. An embodiment of the present invention may also advantageously prevent the disruption of the input/output (I/O) operations between a master host and a master disk subsystem when the remote disk subsystem is being moved from the master site (or manufacturer site) to a remote site. An update information area in the master disk subsystem stores any updated information when the remote disk subsystem is being moved to the remote site, thus preventing the disruption of master host I/O operations to the master disk subsystem. In one embodiment, the present invention provides a method of performing an initial copy procedure in a remote copy system. The method includes: configuring a network path between a first disk subsystem and a second disk subsystem to increase the speed of data transmission across the network path; configuring the remote copy system for a remote copy operation; performing an initial copy operation to copy data across the network path from the first disk subsystem to the second disk subsystem; and adjusting the network path to reduce the speed of data transmission across the network path.

In another embodiment, the present invention provides a method of performing an initial copy procedure in a remote copy system, including: setting a storage media at a first site; performing a split procedure in a first disk subsystem at the first site; copying data from the first disk subsystem in the first site to the storage media; moving the storage media from the first site to a second site; storing the copied data at a second site; and connecting a network path between the first disk subsystem and a second disk subsystem at the second site.

In another embodiment, the present invention provides a remote copy system, comprising: a first disk subsystem located at a first site; and a second disk subsystem capable to be coupled to the first disk subsystem via a network path, with the network path capable to be configured to increase or decrease the speed of data transmission from the first disk subsystem to the second disk subsystem.

In another embodiment, the present invention provides a remote copy system, including: a first disk subsystem located at a first site and capable to store data; and a copy engine capable to capable to copy data stored in the first disk subsystem to a target device, the first disk subsystem further capable to store update information while the target device is placed to a second site.

DETAILED DESCRIPTION OF THE ILLUSTRATED EMBODIMENTS

In the description herein, numerous specific details are provided, such as examples of system components and methods, to provide a thorough understanding of embodiments of the invention. One skilled in the relevant art will recognize, however, that the invention can be practiced without one or more of the specific details, or with other systems, methods, components, materials, parts, and the like. In other instances, well-known structures, materials, or operations are not shown or described in detail to avoid obscuring aspects of the invention.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Figure 1:
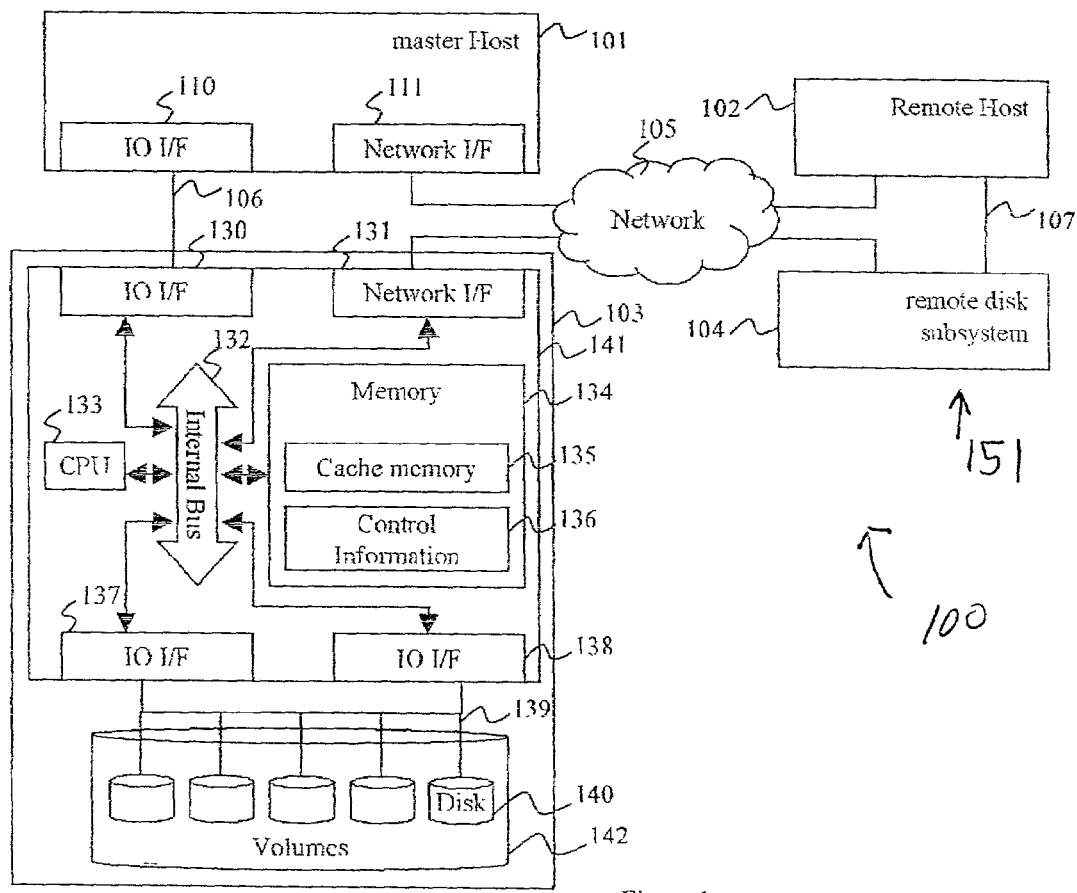
FIG. 1 is block diagram of an example configuration of a remote copy system in accordance with an embodiment of the present invention.

FIG. 1 is a block diagram of an example configuration of a remote copy system 100 according to a specific embodiment of the invention. The remote copy system 100 includes a master host 101 and a remote host 102. The master host 101 is connected to a master disk subsystem 103 by IO path 106, while the remote host 102 is connected to an associated remote disk subsystem 104 by path 107. It is noted that the disk subsystems 102 and 104 (and the various representations of the storage media shown in the subsequent figures) may be deployed at various places. The master host 101, remote host 102, master disk subsystem 103, and remote disk subsystem 104 are connected by a network 105. The IO path 106 (or the IO path 107) may be, for example, SCSI, fibre channel, ESCON™, FICON, Ethernet, or any other type of suitable transmission path. In an embodiment of the invention, the master disk subsystem 103 uses the network 105 for remote copy operations. For the remote copy operation, the network 105 may be a dedicated network, direct connect network, or other suitable networks.

As known to those skilled in the art, SCSI (or Small Computer System Interface) is a parallel interface standard used by Apple Macintosh computers, personal computers (PCs), and many UNIX systems for attaching peripheral devices to computers. SCSI interfaces provide for faster data transmission rates (up to about 80 MBps) than standard serial and parallel ports.

As also known to those skilled in the art, a fibre channel is a serial data transfer architecture developed by a consortium of computer and mass storage device manufacturers and now being standardized by the American National Standards Institute (ANSI). The most prominent fibre channel standard is the Fibre Channel Arbitrated Loop (FC-AL) which is designed for new mass storage devices and other peripheral devices that require a very high bandwidth. Using optical fibers to connect the devices, FC-AL supports full-duplex data transfer rates of approximately 100 megabytes per second (MBps).

As also known to those skilled in the art, ESCON (or Enterprise System Connection) are optical fibre connections between a mainframe computer and its peripherals.

As also known to those skilled in the art, FICON (or fibre connectivity) is a high-speed input/output interface for mainframe computer connections to storage devices.

As also known to those skilled in the art, the Ethernet is currently the most popular type of local area network, which sends its communications through radio frequency signals carried by a coaxial cable. Each computer checks to see if another computer is transmitting and waits its turn to transmit. If two computers accidentally transmit at the same time and their messages collide, the computers wait and send again in turn. Software protocols used by Ethernet systems vary, but include Novell Netware and Transmission Control Protocol/Internet Protocol (TCP/IP).

The master host 101 issues request to the master disk subsystem 103 through input/output interface (IO I/F) 110. The IO interface 110 may handle certain protocols such as SCSI, iSCSI, ESCON, Fibre FICON, and/or other suitable protocols. As known to those skilled in the art, iSCSI (or Internet protocol small computer system interface) uses the Internet Protocol (IP) networking infrastructure to quickly transport large amounts of block storage (SCSI) data over existing local area and/or wide area networks. With the potential to support all major networking protocols, iSCSI (IP SAN) can unify network architecture across an entire enterprise, thus reducing the overall network cost and complexity. To ensure reliability, iSCSI can use known network management tools and utilities that have been developed for IP networks. The iSCSI protocol is discussed, for example, at the website, http://www.ece.cmu.edu/~ips/index.html) in the IP Storage section, http://www.ece.cmu.edu/~ips/Docs/docs.html.

The master host 101 is also connected to network 105 through network interface (I/F) 111. The master host 101 can communicate via network 105 with various devices such as remote host 102, master disk subsystem 103, and remote disk subsystem 104.

The remote host 102 typically has the same configuration and similar components and modules as the master host 101. One difference between the master host 101 and the remote host 102 is that the remote host 102 is deployed at a remote site 151 and is connected to the remote disk subsystem 104.

In one embodiment, the master disk subsystem 103 includes a master disk controller 141 and at least one disk drive 140. The disk controller 141 typically includes an input/output interface (IO I/F) 130 that is coupled to path 106 and a network interface 131 that is coupled to network 105. 10 interface 130 typically controls the requests that are received (via path 106) from the master host 101. Additional 10 interfaces 137 and 138 control the requests to the disk drives 140.

In the specific embodiment shown in FIG. 1, the disk drives 140 are connected to the disk controller 141 by IO path 139. The IO path 139 may be, for example, SCSI, fibre channel, Ethernet, or other suitable types of transmission paths.

The disk drives 140 are managed by a central processing unit (CPU) 133. The CPU 133 typically manages the disk drives 140 into several volumes 142. Typically, the master host 101 may access these volumes 142 and may not the disk drives 140.

The CPU 133 controls the disk controller 141 through an internal bus 132. The internal bus 132 may be, for example, PCI, InfiniBand, a proprietary bus, or other suitable transmission paths. As known to those skilled in the art, PCI (or Peripheral Component Interconnect) is a local bus standard developed by Intel Corporation. Most modern PCs include a PCI bus in addition to a more general Industry Standard Architecture (ISA) expansion bus.

As also known to those skilled in the art, InfiniBand is an architecture and specification for data flow between processors and I/O devices that promises greater bandwidth and almost unlimited expandability in future computer systems. Offering throughput of up to about 2.5 gigabytes per second and support for up to about 64,000 addressable devices, the InfiniBand architecture also promises increased reliability, better sharing of data between clustered processors, and built-in security.

The disk drives 140 may be configured as RAID, JBOD, or any other suitable configuration. As known to those skilled in the art, RAID (or redundant array of independent disks) is a method of storing the same data in different places (thus, redundantly) on multiple hard disks. By placing data on multiple hard disks, input/output operations can overlap in a balanced way, thus leading to improve performance. Since multiple disks increase the mean time between failure (MTBF), storing data redundantly also increases fault-tolerance. A RAID appears to the operating system to be a single logical hard disk. RAID typically employs the technique of "striping," which involves partitioning each drive's storage space into units ranging from a sector (about 512 bytes) up to several megabytes. The stripes of all the disks are interleaved and addressed in order. In a single-user system where large records, such as medical or other scientific images, are stored, the stripes are typically set up to be small (perhaps 512 bytes) so that a single record spans all disks and can be accessed quickly by reading all disks at the same time. In a multi-user system, better performance requires establishing a stripe wide enough to hold the typical or maximum size records. This allows overlapped disk I/O across drives.

As also known to those skilled in the art, JBOD (or "just a bunch of disks") is used to refer to a computer's hard disks that have not been configured according to the RAID system to increase fault tolerance and improve data access performance. As mentioned above, the RAID system stores the same data redundantly on multiple disks that nevertheless appear to the operating system as a single disk. Although, JBOD also makes the disks appear to be a single disk, JBOD accomplishes this effect by combining the drives into one larger logical one.

In the specific embodiment shown in FIG. 1, the disk controller 141 also includes a memory 134. The memory 134 may contain a cache memory 135 and control information area 136. The cache memory 135 stores write data that is sent from the master host 101 and read data that is read by the master host 101. The cache memory 135 also stores pre-fetched data for sequential read requests from the master host 101. The control information area 136 stores information that is used for managing the disk controller 141. Typically, all components that are deployed in the disk controller 141 can access the memory 134 through internal bus 132.

The remote disk subsystem 104 typically has the same configuration and similar components and modules as the master disk subsystem 103. One difference is that the remote disk subsystem 104 is typically deployed on a remote site 151 and is connected to the remote host 102.

Figure 2:
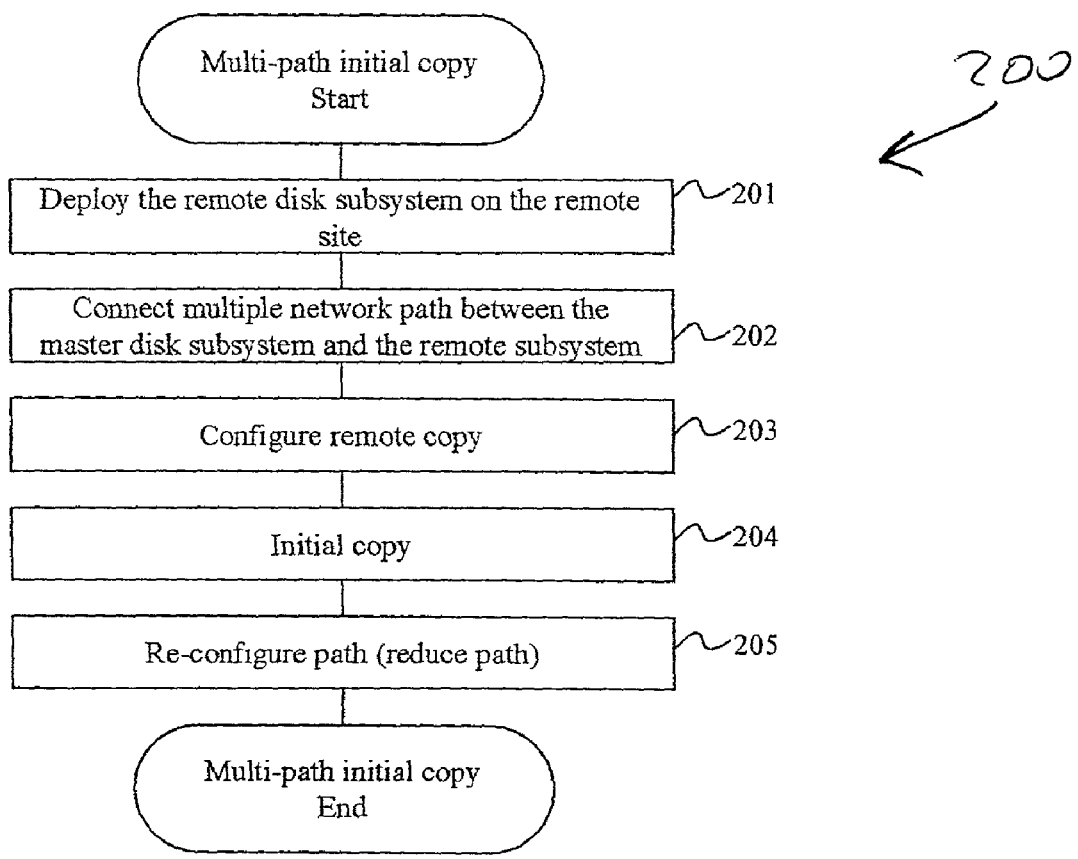
FIG. 2 is a flowchart of a method of performing an initial copy by use of a higher speed network, in accordance with an embodiment of the invention.

FIG. 2 is a flowchart of a method 200 of performing an initial copy by use of a higher speed network, in accordance with a specific embodiment of the invention. If the network 105 (which connects the master site 150 and the remote site 151) has a high throughput (i.e., high data transfer rate), then the time for copying data from the master site 150 to the remote site 151 might be reduced. It is noted that a network is typically very expensive. In this specific embodiment shown in FIG. 2, the network administrator selects a higher network throughput by temporarily using the network 105 for the initial copy procedure. When the initial copy procedure is completed, the administrator may then use a smaller number of network paths. In other words, the method 200 uses a network with a higher throughput for the initial copy as compared to a normal remote copy procedure.

A method of performing an initial copy procedure using multiple paths in a network is now described in accordance with an embodiment of the invention. The network administrator deploys (201) the remote disk subsystem 104 on the remote site 151. The multiple or high speed network path is then connected (202) between the master disk subsystem 103 and the remote disk subsystem 104. This procedure may, for example, involve choosing multiple paths in the network to transmit the initial copy data or by increasing the throughput (data transfer rate characteristic) within one physical line to increase the line performance during the initial copy procedure. The administrator then configures (203) the settings required for performing an initial copy. If the administrator uses only just the higher speed network path, then the administrator uses the same number of path as in a remote copy procedure. Typically, the administrator does not select different settings as those used in a remote copy procedure. After the settings are selected, the administrator can begin (204) the initial copy procedure. During the initial copy procedure, the master host 101 can typically continue to send requests to the master disk subsystem 103.

The master disk subsystem 103 stores updated information (including data) in the memory 134. In one embodiment, the master disk subsystem 103 periodically sends at least some of the data in the memory 134 to the remote disk subsystem 104.

After the initial copies have been made, the administrator may re-configure (205) the network path. This re-configuration procedure may, for example, include reducing the number of paths in the network 105 and/or reducing the network path performance on contract with a network provider. After the paths in the network 105 is reduced, normal remote copy procedures may then be performed.

Figure 3:
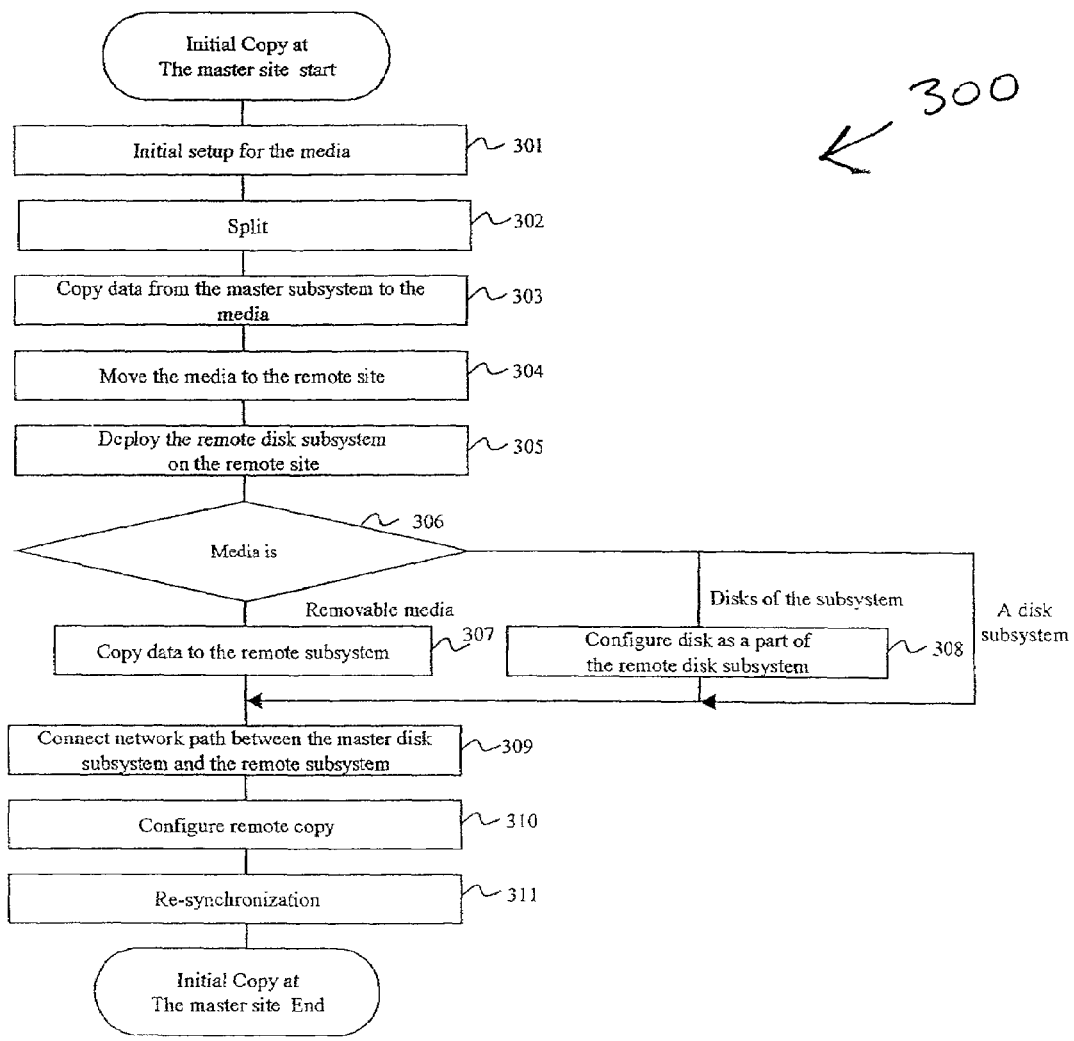
FIG. 3 is a flowchart of a method of performing an initial copy at the master site, in accordance with an embodiment of the invention.

FIG. 3 is a flowchart of a method 300 of performing an initial copy at the master site 150, in accordance with an embodiment of the invention. As noted above, the network 105 may be very expensive to use and/or implement. Thus, the specific embodiment shown in FIG. 3 provides a less costly and higher speed network at the master site 150. During the initial copy procedure, the administrator deploys a storage media (e.g., a tape, tape drive, digital video disc (DVD), compact disc recordable (CD-R), disk, disk drive, computer device, disk 140 for the disk subsystem 103, the disk subsystem 103, or any other suitable device) on the master site 150 and connects the storage media to a higher speed local network in the master site 150. Data copy may then be performed at the master site 150 to achieve a higher initial copy performance. This method provides a less expensive initial copy procedure than using a high speed network for the initial copy. After performing the initial copy, the storage media may then be moved to the remote site 151 for coupling to the remote host 102.

In the specific embodiment shown in FIG. 3, the storage media is initially set up (301) at the master site 150. A split procedure is then performed (302). For example, the split procedure is described further below with reference to FIG. 7 and FIG. 8. Data is then copied (303) from the master disk subsystem 103 to the storage media. The storage media is then moved (304) to the remote site 151. The remote disk subsystem 104 is then deployed (305) on the remote site 151. It is noted that the procedures in block (304) and block (305) are interchangeable. For example, if the remote disk subsystem has already been deployed on the remote site, then the storage media can then be moved and coupled to the remote disk subsystem.

In method 300, the subsequent steps are based on a determination (306) on whether the storage media is a removable media or a disk (or disks) of the remote disk subsystem 104. If the storage media includes a removable media, then the data is copied (307) to the remote disk subsystem 104. If the storage media includes at least one disk of the remote disk subsystem 104, then the disk (or disks) are configured (308) as part of the remote disk subsystem 104. In configuration step (308), the administrator puts the disk(s) into and connects the disk(s) to the remote disk subsystem 104. The administrator configures the disk drive as part of the remote disk subsystem 104 by using a management console (not shown) for the remote disk subsystem 104.

The network 105 path between the master disk subsystem 103 and the remote disk subsystem 104 is then connected (309). The administrator may then configure (310) the system 100 for a remote copy procedure. Data stored in the system 100 may also be re-synchronized so that data in the remote disk subsystem 104 is identical to the data in the master disk subsystem 103.

Figure 4:
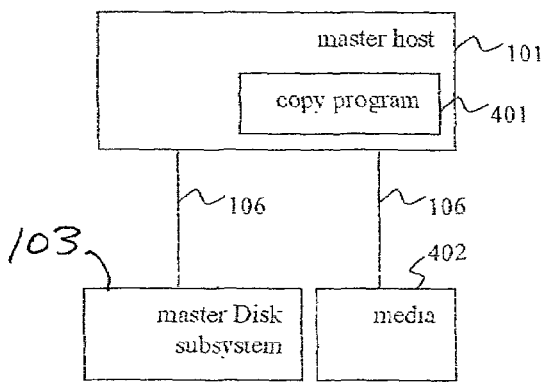
FIG. 4 is a block diagram illustrating a storage media attached to a master host system, in accordance with an embodiment of the invention.

FIG. 4 is a block diagram illustrating a storage media 402 attached to the master host system 101, in accordance with a specific embodiment of the invention. The configuration shown in FIG. 4 permits data to be copied to the storage media 402. The storage media 402 (or other storage media disclosed or described herein) may be, for example, a tape, tape drive, digital video disc (DVD), compact disc recordable (CD-R), disk, disk drive, computer device, disk 140 for the disk subsystem 103, the disk subsystem 103, or any other suitable device. The storage media 402 is deployable on the remote site 151.

The master host 101 copies data to the storage media 402. In one embodiment, a program 401, such as a copy program (engine), is used to execute the copy procedure. The copy program 401 reads data stored in the master disk subsystem 103 and writes the data to the storage media 402.

Figure 5:
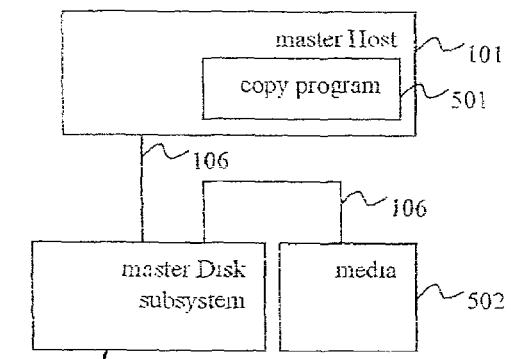
FIG. 5 is a block diagram illustrating a storage media attached to a master disk subsystem, in accordance with an embodiment of the invention.

FIG. 5 is a block diagram illustrating a storage media 502 attached to the master disk subsystem 103, in accordance with another specific embodiment of the invention. Similar to the storage media 402, the storage media 502 may be, for example, a tape, tape drive, DVD, CD-R, disk drive, computer device, disk 140 for the disk subsystem 103, the disk subsystem 103, or any other suitable device. The storage media 502 is deployable on the remote site 151. In the configuration shown in FIG. 5, the master disk subsystem 103, the master host 101, or the media 502 can perform a data copy procedure as described below.

The master host 101 can copy data by using the extended copy command which is defined by SCSI-3 (SPC2). As known to those skilled in the art, SCSI-3 is directed to the following goals: more devices on a bus (up to approximately 32); faster data transfer; greater distances between devices (longer cables); more device classes and command sets; structured documentation; and a structured protocol model. By embedding clock information into a serial data stream signal, SCSI-3 eliminates delay problems. Driving a single signal also consumes less driving power and reduces connector cost and size. To allow for backward compatibility and for added flexibility, SCSI-3 allows the use of several different transport mechanisms, some serial and some parallel. The software protocol and command set is the same for each transport. This leads to a layered protocol definition similar to definitions found in networking.

The master disk subsystem 103 can act as an "initiator" in order to copy data. If the master disk subsystem 103 can act as an initiator, the master disk subsystem 103 includes the copy program 501, and this program 501 copies data from the master disk subsystem 103 (the initiator) to the storage media 502 (the "target").

The storage media 502 can also act as an initiator in order to copy data. If the storage media 502 acts as initiator, then the storage media 502 includes the copy program 501, and this program 501 copies data from the master disk subsystem 103 (the target) to the storage media 502 (the initiator). It is noted that the copy program 501 is shown in FIG. 5 as being included in the master host 101 for purposes of discussion and example only, and this illustrated configuration is not intended to be limiting.

Figure 6:
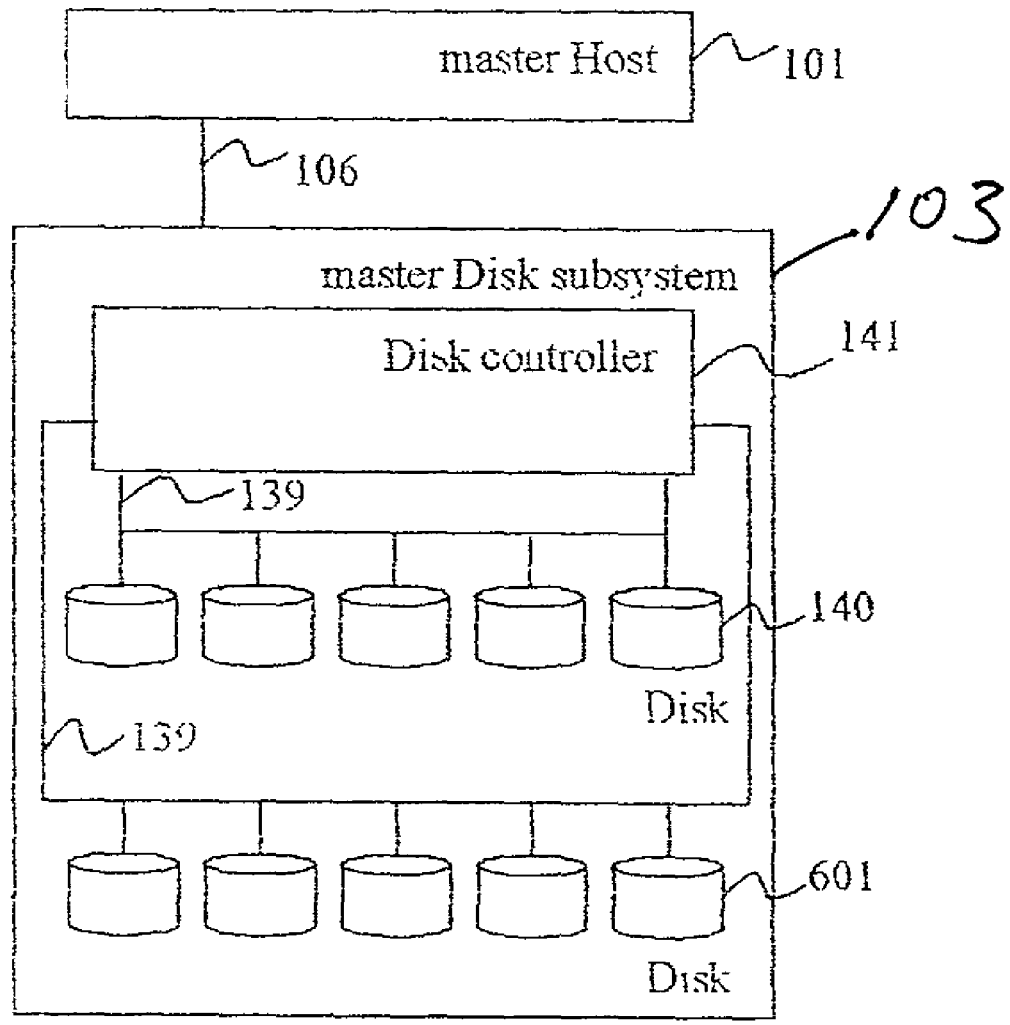
FIG. 6 is a block diagram of an example of a configuration of the storage media.

FIG. 6 is a block diagram of an example of a configuration of the storage media 402 or 502. In the specific embodiment shown in FIG. 6, the storage media includes at least one disk drive 601, where each disk drive 601 is typically configured as a disk drive of the remote disk subsystem 104 (FIG. 1). The master disk controller 141 copies data from the disk drives 140 to the disk drives 601. When the storage media is set up in the master site 150 and coupled to the master host 101, the administrator should initiate the split procedure (302) as shown in FIG. 3. This split procedure is performed in the master disk subsystem 103, as illustrated by the arrow 802 in FIG. 8.

Split Procedure

When a split occurs, the master disk subsystem 103 keeps the update information until the administrator issues a re-synchronization command. The update information may be, for example, a bit map that indicate the updated data as "1" and the non-updated data as "0". Those update information will be used during the re-synchronization procedure. The administrator copies data from the disk drives 140 to the storage media (e.g., storage media 402 or 502).

The split procedure can be performed in two ways: (1) split procedure with shadow image, and (2) split without shadow image.

Split Procedure with Shadow Image

Figure 7:
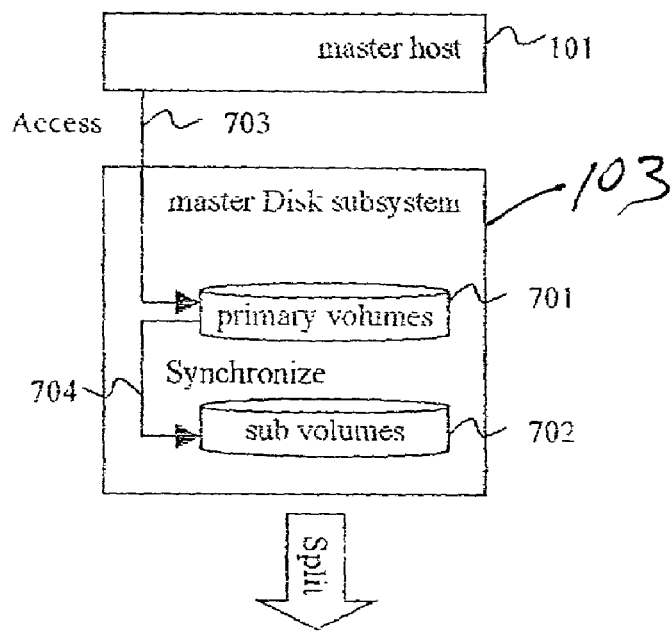
FIG. 7 is a block diagram showing a split procedure with a shadow image.
Figure 7:
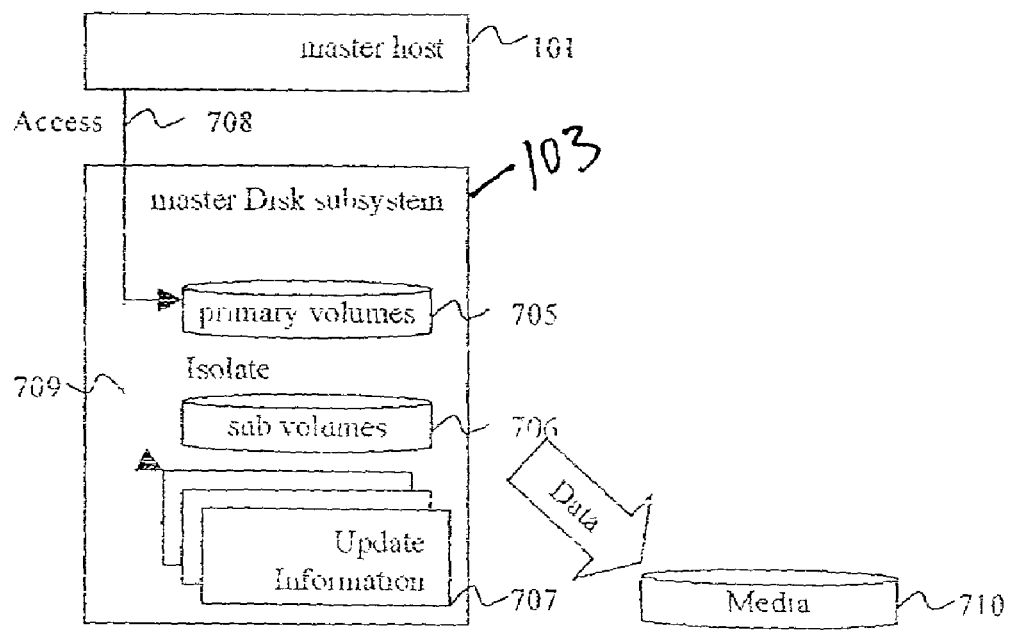

FIG. 7 is a block diagram showing a split procedure with a shadow image. In this example, the master disk subsystem 103 includes a shadow image function as described below. A shadow image is a replicate of an information, where the replicate is created without typically disrupting operations and overall performance levels. The sub volumes 702 provides a shadow image (same volume image) of the information in primary volumes 701 within the master disk subsystem 103. When the master host 101 writes (updates) data in the primary volumes 701 (as illustrated by arrow 703), the shadow image function also writes (updates) the same data into the sub volumes 702 (as illustrated by arrow 704).

As an example, when the split procedure is executed, sub volumes 706 are isolated from the primary volumes 705. When the master host 101 writes (updates) data in the primary volumes 705 (as illustrated by arrow 708), the update information is stored in the update information area 707 (as illustrated by arrow 709). Thus, the update information is not stored in the sub volume 706 (which is configured to store a shadow image of primary volumes 705) because volumes 705 and 706 are isolated from each other due to the split condition. When the split procedure is completed, the administrator copies data from sub volumes 706 to the storage media 710. When the data copy to the storage media 710 is completed, the administrator moves the storage media 710 to the remote site 151, and the administrator can then copy data to the remote disk subsystem 104. The administrator can also re-synchronize by copying the update information area 707 and the data in the primary volumes 705 to the remote disk subsystem 104 by, for example, use of a suitable connection. The administrator may, for example, use these data for another purpose, because this method provides data consistency at the split.

Split Procedure Without Shadow Image

Figure 8:
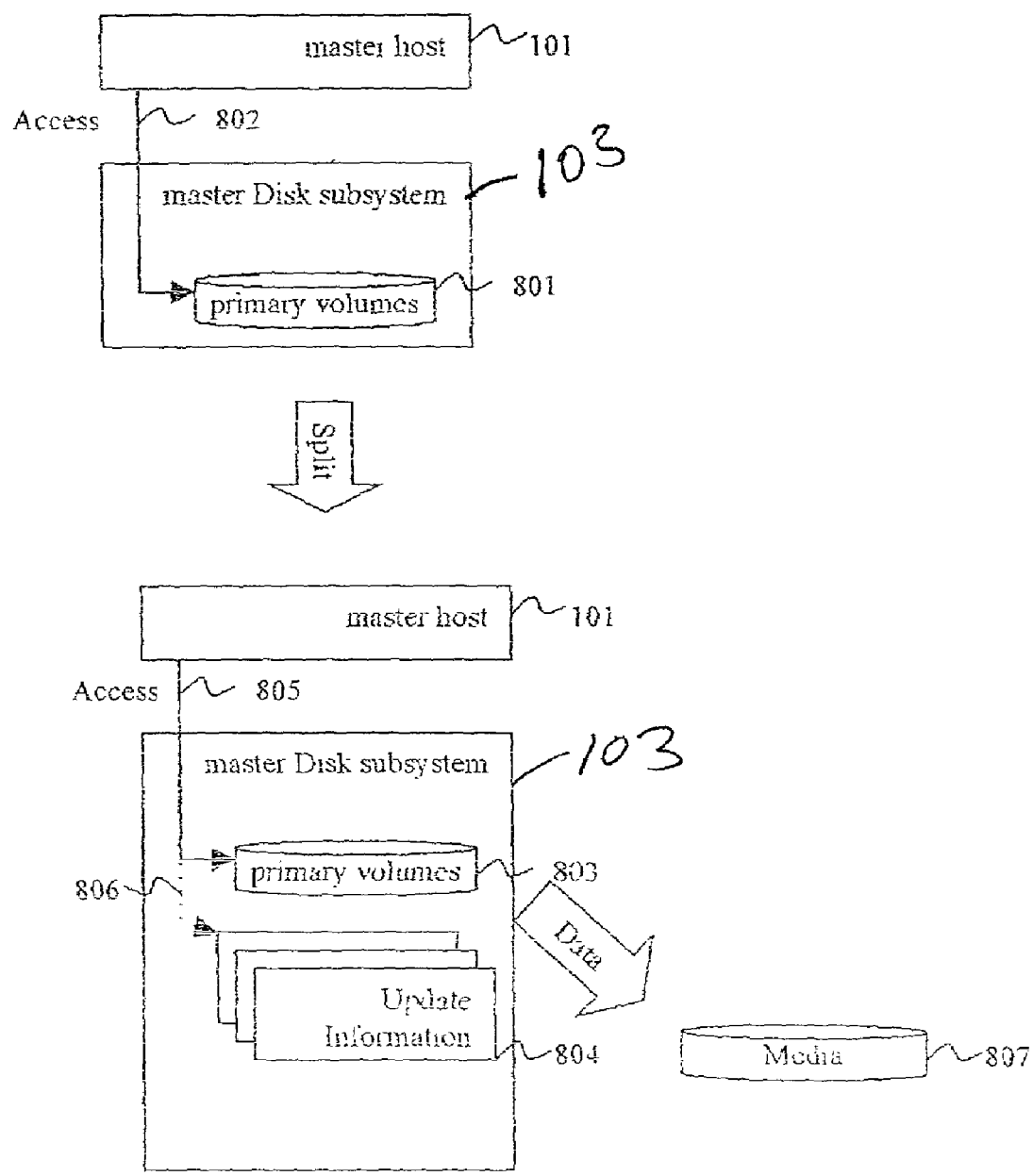
FIG. 8 is a block diagram showing a split procedure without a shadow image.

FIG. 8 is a block diagram showing a split procedure without a shadow image. In this example, the master disk subsystem 103 does not require the shadow image function. The master host 101 can write (update) data in the primary volumes 801 (as illustrated by arrow 802).

As an example, when a split procedure is executed, the master disk subsystem 103 stores update information in the update information area 804 (as illustrated by arrow 806). When the master host 101 writes (updates) data in the primary volumes 803 (as illustrated by arrow 805), this update information is also stored in the update information area 804 (as illustrated by arrow 806). When the split procedure is completed, the administrator copies data from sub volumes 803 to the storage media 807. When the copy of the data to the storage media 807 is completed, the administrator can move the storage media 807 to the remote site 151, and the administrator can copy the data to the remote disk subsystem 104. The administrator can re-synchronize by using the update information area 804 and data primary volumes 803, as similarly described above. In this particular case, the media 807 may have no consistency, but re-synchronization works well by using the update information area 804.

After the split procedure, the administrator may copy the data from the master disk subsystem 103 to the storage media (as also illustrated above in block 303 in FIG. 3). The data copied to the storage media will be configured as the remote copy data for storage in the remote disk subsystem 104 (FIG. 1). It is noted that the copy method in block 303 may vary and may depend on the environment of the administrator. When the data copy to the storage media is completed, the administrator may move the storage media from the master site 150 to the remote site 151 (as also illustrated above in block 304). It is noted that the method of moving the storage media to the remote site 151 may be performed by various techniques. The administrator also deploys the remote disk subsystem 104 to the remote site 151 (as also illustrated above in block 305). If there is already a disk subsystem 104 on the remote site 151, then it may not be necessary for the administrator to deploy the disk subsystem 104 on the remote site 151. The administrator can then set up the remote disk subsystem 104. This set up includes copying data from the storage media (e.g., storage media 710 or storage media 807) to the remote disk subsystem 104. If the storage media is a removable media, then the administrator can copy data from this removable media to the remote disk subsystem 104. The configuration of the system for the copy procedure may vary and may depend on the environment of the administrator. The administrator can, for example, choose the configuration in FIG. 4 or FIG. 5 or other configurations, and can choose a suitable method for copying (as performed in block 307 in FIG. 3).

As another example, if the storage media are disk drives (e.g., disk drives of the type that are similar to disk drives 140) and are to be a part of the remote disk subsystem 104, then the administrator can put the disk drives into the remote disk subsystem 104. The administrator then configures these disk drives as part of the remote disk subsystem 104 (as also illustrated above in block 308 in FIG. 3).

As another example, if the storage media is the remote disk subsystem 104 itself, then the set up of the storage media in the remote site 151 is completed in block 305 in FIG. 3. The administrator then connects the remote disk subsystem 104 to the network 105 for the remote copy procedure. At this time, the master disk subsystem 103 also is typically connected to the network 105 (as also illustrated above in block 309 in FIG. 3). The administrator then configures the remote copy settings to permit remote copy operations (as also illustrated above in block 310 in FIG. 3). The administrator can then re-synchronize data between the master disk subsystem 103 and the remote disk subsystem 104 (as also illustrated above in block 311 in FIG. 3).

Figure 9:
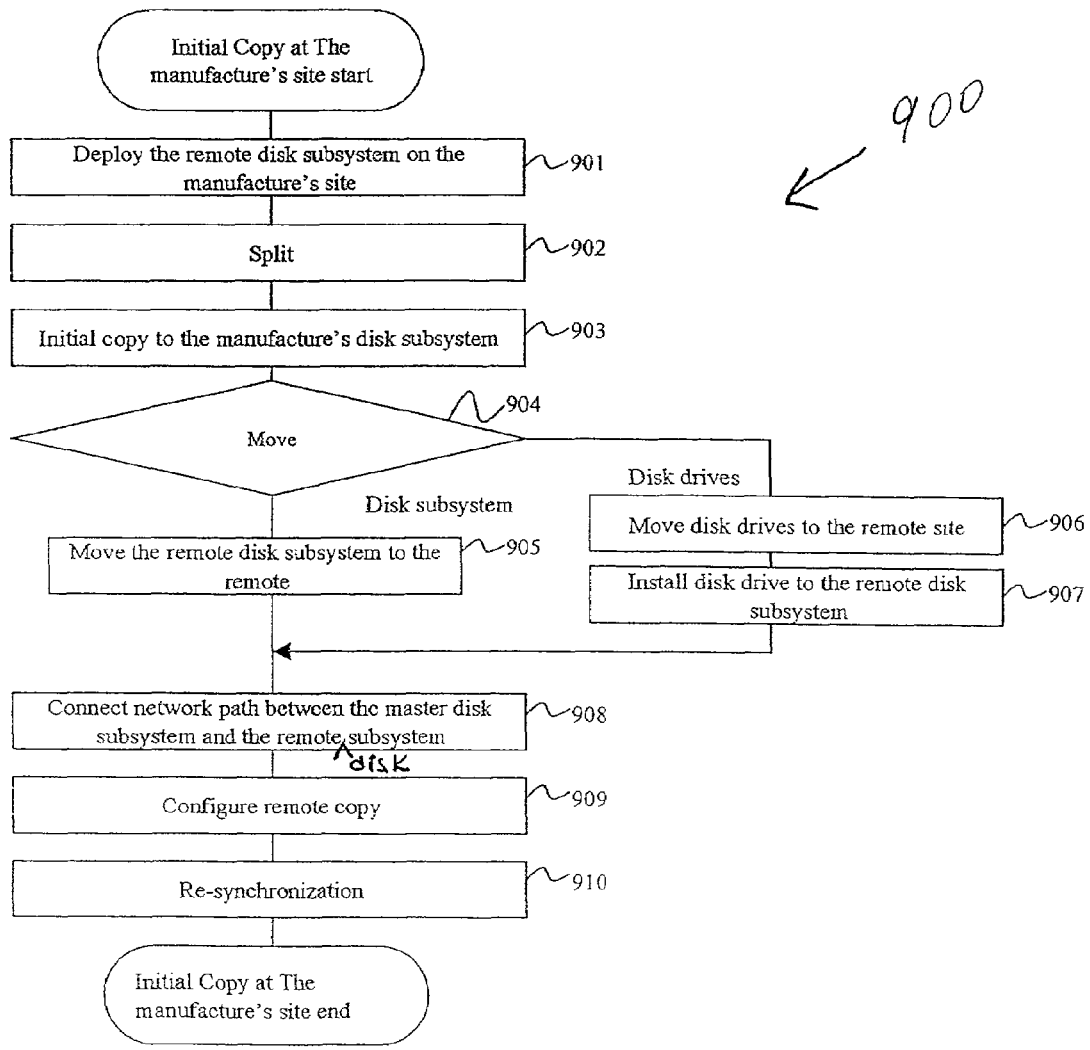
FIG. 9 is a flowchart illustrating a method of performing an initial copy at a manufacturer's site, in accordance with an embodiment of the invention.

FIG. 9 is a flowchart illustrating a method 900 of performing an initial copy at a manufacturer's site, in accordance with a specific embodiment of the invention. It is noted that to deploy the remote disk subsystem 104 on the master site 150 may be difficult in some cases. The master site 150 and the manufacturer site may be connected by a higher speed network used for certain purposes such as initial copy procedures. In this embodiment, data copy is performed at a site of a manufacture in order to achieve higher initial copy performance. Thus, this embodiment provides a less costly and higher speed network without the requirement of having to deploy the remote disk subsystem 104 on the master site 150. It also noted that in another embodiment, the administrator can copy data at the site of the manufacturer by use of a storage media as similarly described above. In various embodiments, pre-copied disk subsystems are used.

In FIG. 9, the administrator first deploys (901) a disk subsystem (such as the remote disk subsystem 104) at the site of a manufacturer. Alternatively, as similarly described above, the administrator can deploy a storage media at the site of the manufacturer to perform the initial copy procedure described below. A split procedure is then performed (902). The split procedure was described above in the method for performing an initial copy at the master site 150. The administrator then initially copies (903) data to the remote disk subsystem 104 from the manufacturer's disk subsystem. In this initial copy procedure, the administrator may use any suitable method such as, for example, (1) performing an initial copy by use of a higher speed network as similarly illustrated above in blocks 202 to 204 in FIG. 2, or (2) performing an initial copy at the master site 150 as illustrated above in block 303 in FIG. 3. When the initial copy procedure is completed, the administrator can move (904) the data to the remote site 151. The administrator can move (905) the remote disk subsystem 104 itself to the remote site 151. If the administrator has already moved the remote disk subsystem 104 to the remote site 151 and the disk drives (or other storage media) are used for copying the data from the site of the manufacturer, then the administrator can move (906) the disk drives. At the remote site 151, the administrator can install (907) the disk drives into the remote disk subsystem 104. The administrator then connects (908) the network 105 path between the master disk subsystem 103 and the remote disk subsystem 104. The administrator also configures (909) the master disk subsystem 103 and the remote disk subsystem 104 for remote copy operations. The administrator then re-synchronizes (910) the master disk subsystem 103 and the remote disk subsystem 104. This re-synchronization method was similarly described above in the method for performing an initial copy at the master site 150 as illustrated in block 311 in FIG. 3.

Other variations and modifications of the above-described embodiments and methods are possible in light of the foregoing teaching. For example, the term "network administrator" is not limited to a single individual.

It is also within the scope of the present invention to implement a program or code that can be stored in an electronically-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of performing an initial copy procedure in a remote copy system, the method comprising:
   configuring a network path between a first disk subsystem and a second disk subsystem to increase the speed of data transmission across the network path for the initial copy procedure;
   after the configuring the network path, configuring the remote copy system for a remote copy operation;
   after the configuring the remote copy system, performing an initial remote copy operation to copy data across the network path from the first disk subsystem to the second disk subsystem, wherein the initial remote copy operation comprises copying of data initially stored in the first disk subsystem to the second disk subsystem; and
   after the performing the initial remote copy operation, adjusting the network path to reduce the speed of data transmission across the network path, thereby reducing the speed of at least one subsequent remote copy operation between the first disk system and the second disk system, wherein the at least one subsequent remote copy operation comprises copying of data update from the first disk subsystem to the second disk subsystem and wherein configuring the network path comprises increasing a data transfer rate characteristic of the network path.

2. The method of claim 1 wherein the first disk subsystem is located in a master site.

3. The method of claim 1 wherein the first disk subsystem is located in a manufacturer site.

4. The method of claim 1, further comprising:
   deploying the second disk subsystem to a remote site.

5. An article of manufacture, comprising:
   a machine-readable medium having stored thereon instructions to:
   configure a network path between a first disk subsystem and a second disk subsystem to increase the speed of data transmission across the network path for an initial remote copy operation;
   after configuring the network path, configure the remote copy system for a remote copy operation;
   after configuring the remote copy system, perform the initial remote copy operation to copy data across the network path from the first disk subsystem to the second disk subsystem, wherein the initial remote copy operation comprises copying of data initially stored in the first disk subsystem to the second disk subsystem; and
   after performing the initial remote copy operation, adjust the network path to reduce the speed of data transmission across the network path and thereby reduce the speed of at least one subsequent remote copy operation between the first disk system and the second disk system, wherein the at least one subsequent remote copy operation comprises copying of data update from the first disk subsystem to the second disk subsystem and wherein configuring the network path comprises selecting multiple physical oaths in the network path to transmit data across the path.

6. A remote copy system, comprising:
   a first disk subsystem located at a first site;
   a second disk subsystem capable to be coupled to the first disk subsystem via a network path, with the network path capable to be configured to increase or decrease the speed of data transmission from the first disk subsystem to the second disk subsystem; and
   means for configuring the network path to cause an initial remote copy operation between the first disk subsystem and the second disk subsystem to occur at an initial data transmission speed that is faster than a subsequent data transmission speed of at least one subsequent remote copy operation, the configuring the network path to cause an initial remote copy operation occurring before the subsequent remote copy operation, wherein the initial remote copy operation comprises copying of data initially stored in the first disk subsystem to the second disk subsystem and the at least one subsequent remote copy operation comprises copying of data update from the first disk subsystem to the second disk subsystem and wherein configuring the network oath comprises selecting multiple physical oaths in the network oath to transmit data across the path.

7. A method of performing an initial copy procedure in a remote copy system, the method comprising:
   configuring a network path between a first disk subsystem and a second disk subsystem to increase the speed of data transmission across the network path for the initial copy procedure;
   after the configuring the network path, configuring the remote copy system for a remote copy operation
   after the configuring the remote copy system, performing an initial remote copy operation to copy data across the network path from the first disk subsystem to the second disk subsystem, wherein the initial remote copy operation comprises copying of data initially stored in the first disk subsystem to the second disk subsystem; and after the performing the initial remote copy operation, adjusting the network path to reduce the speed of data transmission across the network path, thereby reducing the speed of at least one subsequent remote copy operation between the first disk system and the second disk system, wherein the at least one subsequent remote copy operation comprises copying of data update from the first disk subsystem to the second disk subsystem and wherein configuring the network path comprises selecting multiple physical paths in the network path to transmit data across the path.

8. The method of claim 7, wherein the first disk subsystem is located in a master site.

9. The method of claim 7, wherein the first disk subsystem is located in a manufacturer site.

10. The method of claim 7, further comprising:
deploying the second disk subsystem to a remote site.

11. A method of performing an initial copy procedure in a remote copy system, the method comprising:

configuring a network path between a first disk subsystem and a second disk subsystem to increase the speed of data transmission across the network path for the initial copy procedure;

after the configuring the network path, configuring the remote copy system for a remote copy operation after the configuring the remote copy system, performing an initial remote copy operation to copy data across the network path from the first disk subsystem to the second disk subsystem, wherein the initial remote copy operation comprises copying of data initially stored in the first disk subsystem to the second disk subsystem; and after the performing the initial remote copy operation, adjusting the network path to reduce the speed of data transmission across the network path, thereby reducing the speed of at least one subsequent remote copy operation between the first disk system and the second disk system, wherein the at least one subsequent remote copy operation comprises copying of data update from the first disk subsystem to the second disk subsystem, wherein adjusting the network path comprises reducing the number of physical paths in the network path.

12. The method of claim 11 wherein the first disk subsystem is located in a master site.

13. The method of claim 11 wherein the first disk subsystem is located in a manufacturer site.

14. The method of claim 11, further comprising:
deploying the second disk subsystem to a remote site.

15. A method of performing an initial copy procedure in a remote copy system, the method comprising:

configuring a network path between a first disk subsystem and a second disk subsystem to increase the speed of data transmission across the network path for the initial copy procedure;

after the configuring the network path, configuring the remote copy system for a remote copy operation;

after the configuring the remote copy system, performing an initial remote copy operation to copy data across the network path from the first disk subsystem to the second disk subsystem, wherein the initial remote copy operation comprises copying of data initially stored in the first disk subsystem to the second disk subsystem; and after the performing the initial remote copy operation, adjusting the network path to reduce the speed of data transmission across the network path, thereby reducing the speed of at least one subsequent remote copy operation between the first disk system and the second disk system, wherein the at least one subsequent remote copy operation comprises copying of data update from the first disk subsystem to the second disk subsystem, wherein adjusting the network path comprises decreasing the data transfer rate characteristic of the network path.

16. The method of claim 15 wherein the first disk subsystem is located in a master site.

17. The method of claim 15 wherein the first disk subsystem is located in a manufacturer site.

18. The method of claim 15, further comprising:
deploying the second disk subsystem to a remote site.

* * * * *